Dec. 5, 1967     T. H. CICHETTI     3,356,171

TRACTION ASSISTANCE DEVICE

Original Filed July 7, 1964     4 Sheets-Sheet 1

INVENTOR
THOMAS H. CICHETTI

BY Green, McCallister &
Miller
HIS ATTORNEYS

Dec. 5, 1967  T. H. CICHETTI  3,356,171
TRACTION ASSISTANCE DEVICE
Original Filed July 7, 1964  4 Sheets-Sheet 2
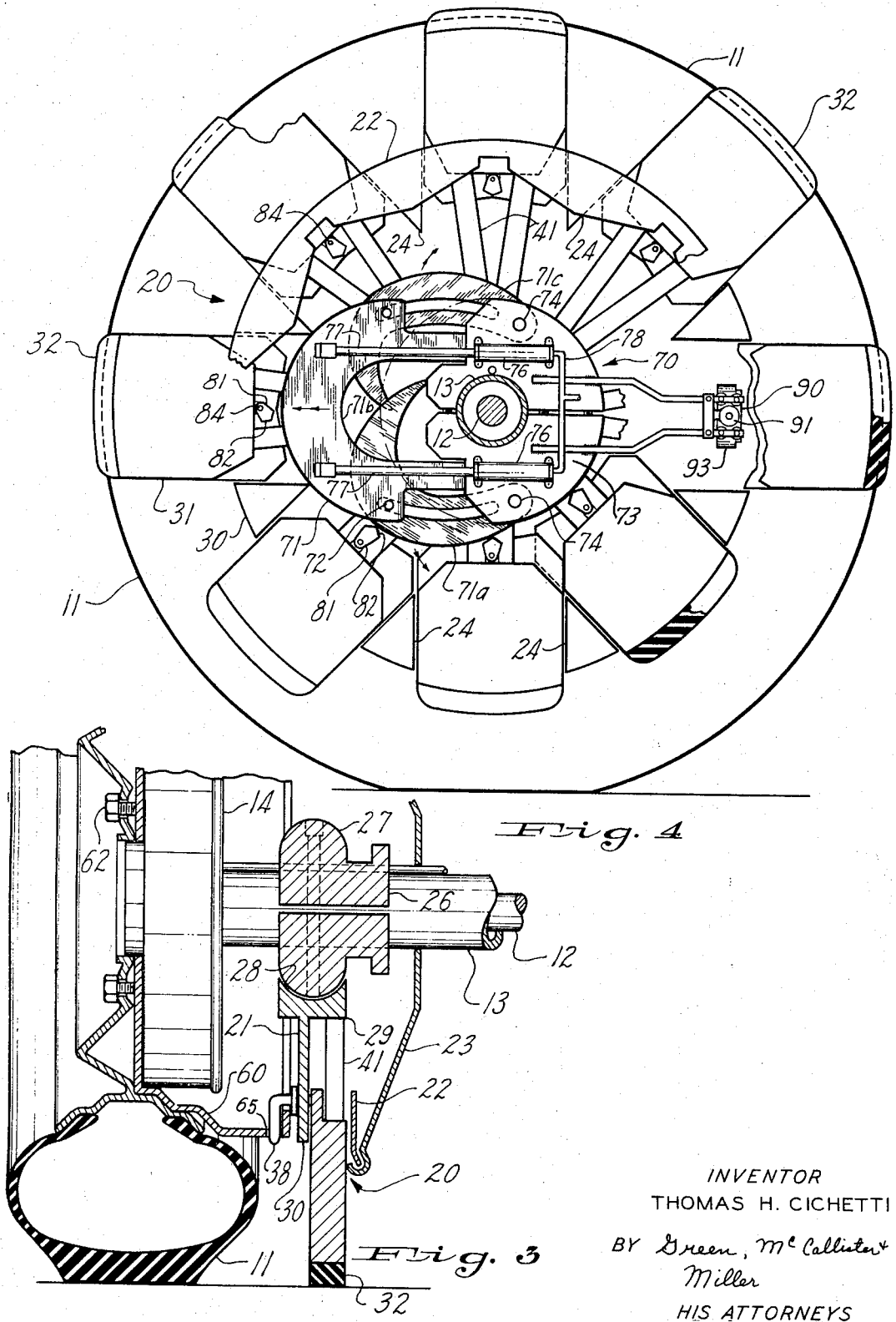
INVENTOR
THOMAS H. CICHETTI
BY Green, McCallister &
Miller
HIS ATTORNEYS

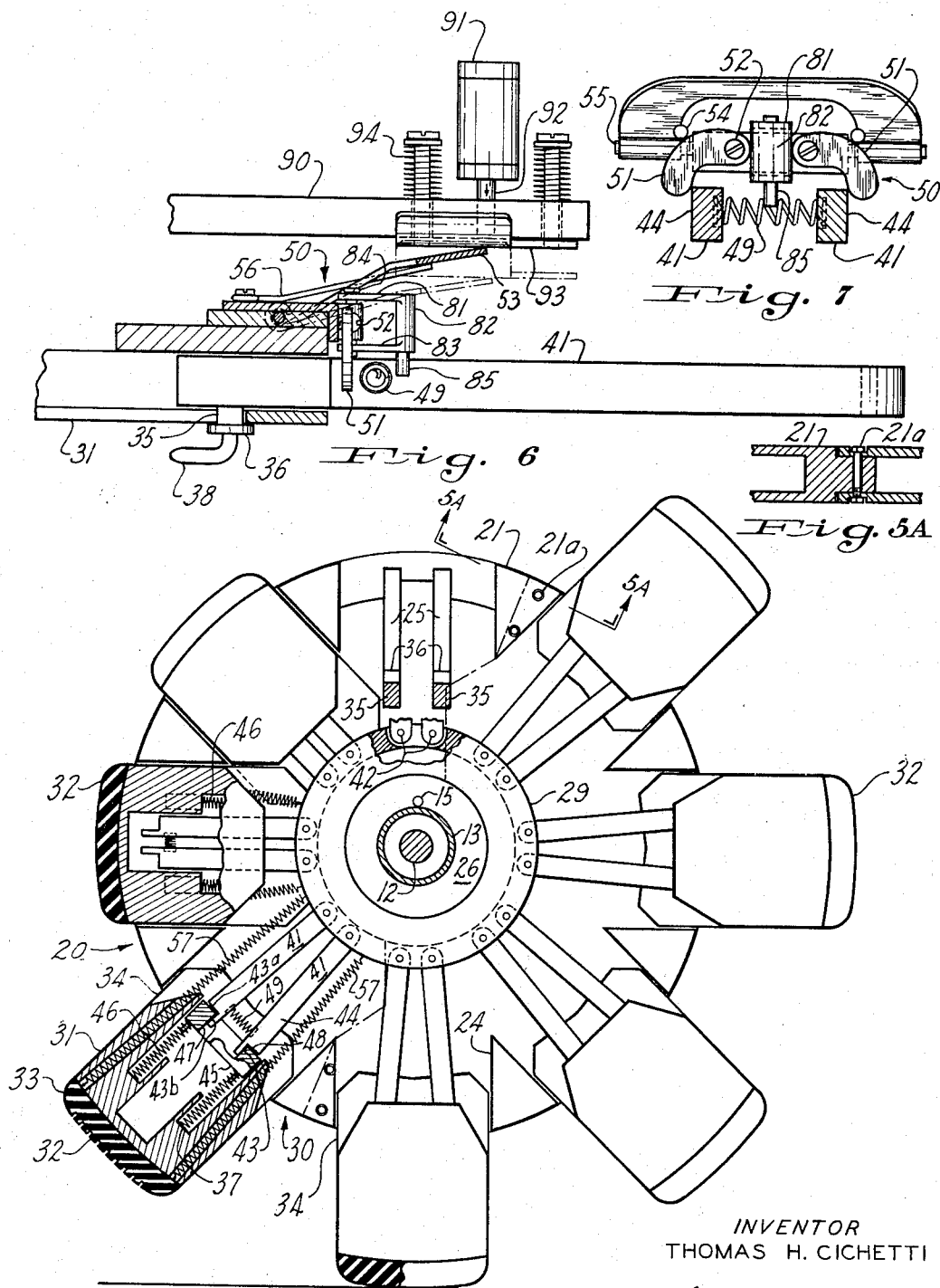

Dec. 5, 1967  T. H. CICHETTI  3,356,171
TRACTION ASSISTANCE DEVICE
Original Filed July 7, 1964  4 Sheets-Sheet 4
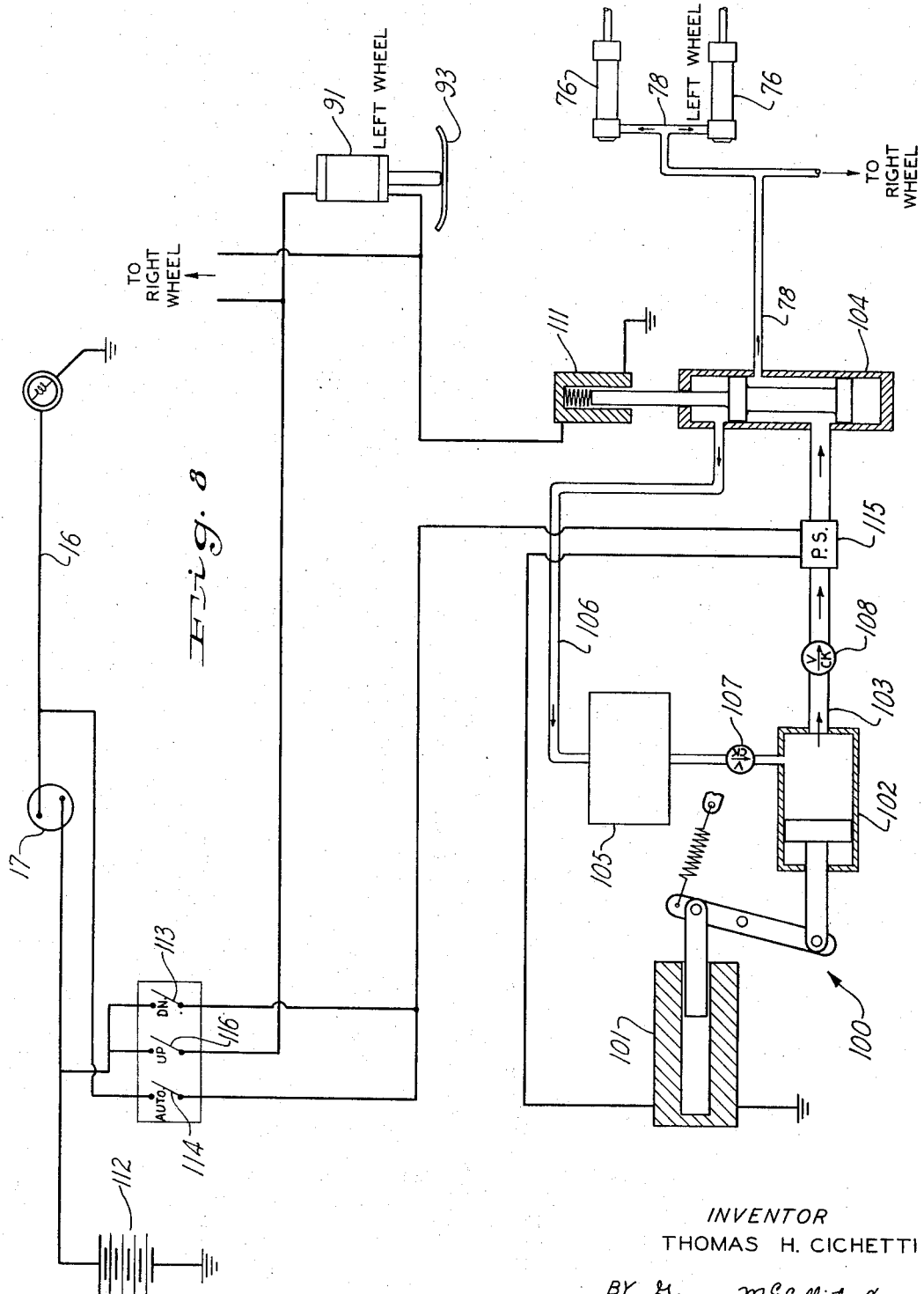
INVENTOR
THOMAS H. CICHETTI
BY Green, McCallister &
Miller
HIS ATTORNEYS

[US Patent 3,356,171 — Patented Dec. 5, 1967]

3,356,171
TRACTION ASSISTANCE DEVICE
Thomas H. Cichetti, 15 E. Tacoma Ave.,
Latrobe, Pa. 15650
Continuation of application Ser. No. 380,752, July 7, 1964. This application June 10, 1966, Ser. No. 562,048
13 Claims. (Cl. 180—15)

This is a continuation of my application Ser. No. 380,752, filed July 7, 1964, and entitled, "Emergency Drive Mechanism," which has been abandoned in favor of the present application.

This invention relates generally to an emergency device for improving an operator's control of a wheeled vehicle and more particularly pertains to a traction assistance mechanism for use on a vehicle for moving over or stopping on a relatively slippery road or paved surface.

In this age of superhighways and suburban living, snow and ice pose a ridiculously expensive and inconvenient problem which has been solved only partially and by rather crude methods. It is a common occurrence for superhighways and other main arteries to be clear and dry while suburban side roads and driveways remain impassable without tire chains or their equivalent. Snow tires have provided one of the best compromise solutions to this problem but even snow tires are ineffective on hard packed snow and ice where even a slight grade is involved. Tire chains are a most unsatisfactory solution to the problem of winter traction due to the large amount of dry road superhighways usually encountered on any trip. Tire chains driven on snow-free roads tend to tear up the road, as well as the tires and are subjected to severe wear which gives them a limited life. These disadvantages are in addition to the well known difficulty of installing and removing the tire chains whenever they are used.

Looking at the problem from a slightly different angle, it will be realized that while driving under poor traction conditions constitutes a small percentage of the total driving mileage, a very small amount of ice or mud critically located beneath the driving wheels makes a road or driveway as impassable as if it were crossed by a brick wall. To continuously employ permanent or semi-permanent means such as lugs or tire chains to be prepared for a possible encounter with snow, ice, or mud, makes driving over clear highways uncomfortable and expensive to both the driver and the general public.

Accordingly, an object of my invention has been to fully investigate the problem of providing practical, comfortable and effective road traction for all situations;

Another object of my invention has been to devise a traction assistance mechanism for use on any vehicular means of transportation that employs a plurality of wheels to permit its movement over a surface;

Another object of my invention has been to substantially increase an operator's control of a wheeled vehicle by furnishing a selectively-operable means of increasing the total area of frictional contact between the vehicle and the surface over which it moves;

Another object of my invention has been to devise auxiliary drive mechanism for use in low traction driving situations that can be operated at will, even while moving, to provide additional traction;

Another object of my invention has been to devise auxiliary drive mechanism that is operated directly from the existing vehicle transmission and axle system but which does not interfere with the transmission and axle system or any other portion of the vehicle;

A further object of my invention has been to devise an auxiliary drive actuating mechanism that is constructed to encounter a minimum of force so as to permit lightweight inexpensive construction;

A further important object of my invention has been to devise an auxiliary drive mechanism that is automatically operable in response to the operation of the vehicle brakes so as to permit the last minute use of high traction assistance in an emergency situation;

These and other objects of my invention will become more apparent to those skilled in the art on reading and understanding the following description of the inventive concepts on which my invention is based, a specific illustrative embodiment thereof, and the appended claims.

One phase of my invention relates to the construction of an emergency safety wheel wherein an annular array of radially movable traction shoes is operatively supported about the vehicle axle housing. The traction shoes each have a circumferentially extending foot portion that provides a high traction or biting tread that concentrates the vehicle weight on a relatively small area to maximize the road gripping action. The traction shoes are actuated outwardly, from an inoperative position adjacent the vehicle axle, to an operative position wherein they extend outwardly of the vehicle wheel.

I have determined that it is impractical merely to simultaneously actuate all of the traction shoes. Simultaneous actuation of the traction shoes requires that the traction shoe or shoes facing the road surface must effectively lift the weight of the vehicle placing a large force on the actuating means and requiring a heavier and more expensive construction thereof. To avoid the unnecessary and undesirable expense and weight costs, I have provided a cam type sequential actuator that moves each of the traction shoes outwardly while it is out of contact with the road surface. Once in their outer positions, the traction shoes are locked in place by a spoke-like element or elements extending directly between the axle housing and the traction shoes. It will thus be seen that the structural support of the safety wheel in its operative position is separate and apart from the actuating mechanism. This permits the use of relatively lightweight and inexpensive actuating parts for obtaining a relatively complicated actuating motion and at the same time provides for adequate vehicle supporting strength without continuous wear on the actuating mechanism.

Another phase or novel concept of my invention relates to a construction of the auxiliary wheel wherein the wheel does not rotate with the main vehicle driving wheel except when the auxiliary wheel is placed in operative position. It will be appreciated that any auxiliary wheel construction will contain considerable mass that is located primarily toward the outer circumference and thus would, when turning, tend to add considerable rotational inertia to the wheels. Also, centrifugal force on radially movable traction shoes tends to move them toward their operative position thus requiring a more than nominal retaining means for the shoes. To cause the auxiliary wheel to rotate only when the shoes are in their operative position, the auxiliary wheel is mounted for free rotation upon the driving axle housing of the vehicle. A driving drum having radially outwardly facing openings therein, is securely attached to the vehicle wheels to act as a torque arm between the vehicle wheel and the auxiliary wheel. The traction shoes of the auxiliary wheel are each provided with a cleat that moves into engagement with the openings of the driving drum as the traction shoes move radially outwardly. Conversely, the cleats are disengaged from the openings when the traction shoes are retracted, thus severing the driving connection between the vehicle wheel and the auxiliary wheel.

A further phase of my invention relates to the retraction or de-energization of the traction shoes, which is accomplished sequentially by a single localized trigger actuator which operates on individual trigger mechanisms carried by each of the traction shoes. As each traction shoe carries its own de-actuating trigger mechanism, failure causing undesired release of one shoe member will not eliminate the overall effectiveness of the auxiliary wheel. The localized de-actuating mechanism is preferably positioned with respect to the actuating mechanism such that failure of the de-actuating mechanism causing undesired release of all the shoe members can be overcome simply by continuous operation of the main actuator mechanism.

These phases of my invention are exemplified and more fully explained in the following description of some illustrative embodiments of my invention wherein reference is made to the accompanying drawings, of which:

FIGURE 3 is a somewhat simplified front cross-sectional view of the mechanism shown in FIGURE 2, assembled and in place on an automobile wheel;

FIGURE 4 is a side view of the mechanism of FIGURE 2 as assembled and taken along the line IV—IV of FIGURE 2;

FIGURE 5 is a side view of the mechanism of FIGURE 2 assembled and taken along the line V—V of FIGURE 2;

FIGURE 5A is a fractional cross-sectional view of a portion of FIGURE 5 taken along line 5A—5A thereof showing a detail of construction;

FIGURES 6 and 7 are enlarged detail views of operating parts of my traction assistance mechanism;

And FIGURE 8 is a somewhat schematic showing of a preferred control and actuating system for use in conjunction with my traction assistance mechanism.

Figure 1:
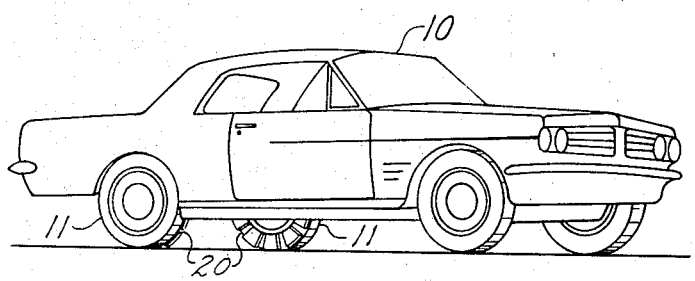
FIGURE 1 is a perspective pictorial view of an automobile that is equipped with the traction assistance mechanism of my invention in its operative position.

Turning now more specifically to the drawings, in FIGURE 1 there is seen a motor vehicle such as an automobile 10 that has a pair of power driven wheels 11 that are mounted on and supported by powered axle 12 (see FIGURE 3) that is rotatably mounted within a fixed axle case or housing 13. A conventional driver operated braking mechanism including a brake drum is indicated at 14. Adjacent the inside of each wheel 11 there is mounted an auxiliary drive mechanism, or emergency wheel or traction assistance device 20 that is constructed in accordance with my invention. The mechanisms 20 are identical and accordingly only one need be discussed in detail.

Figure 2:
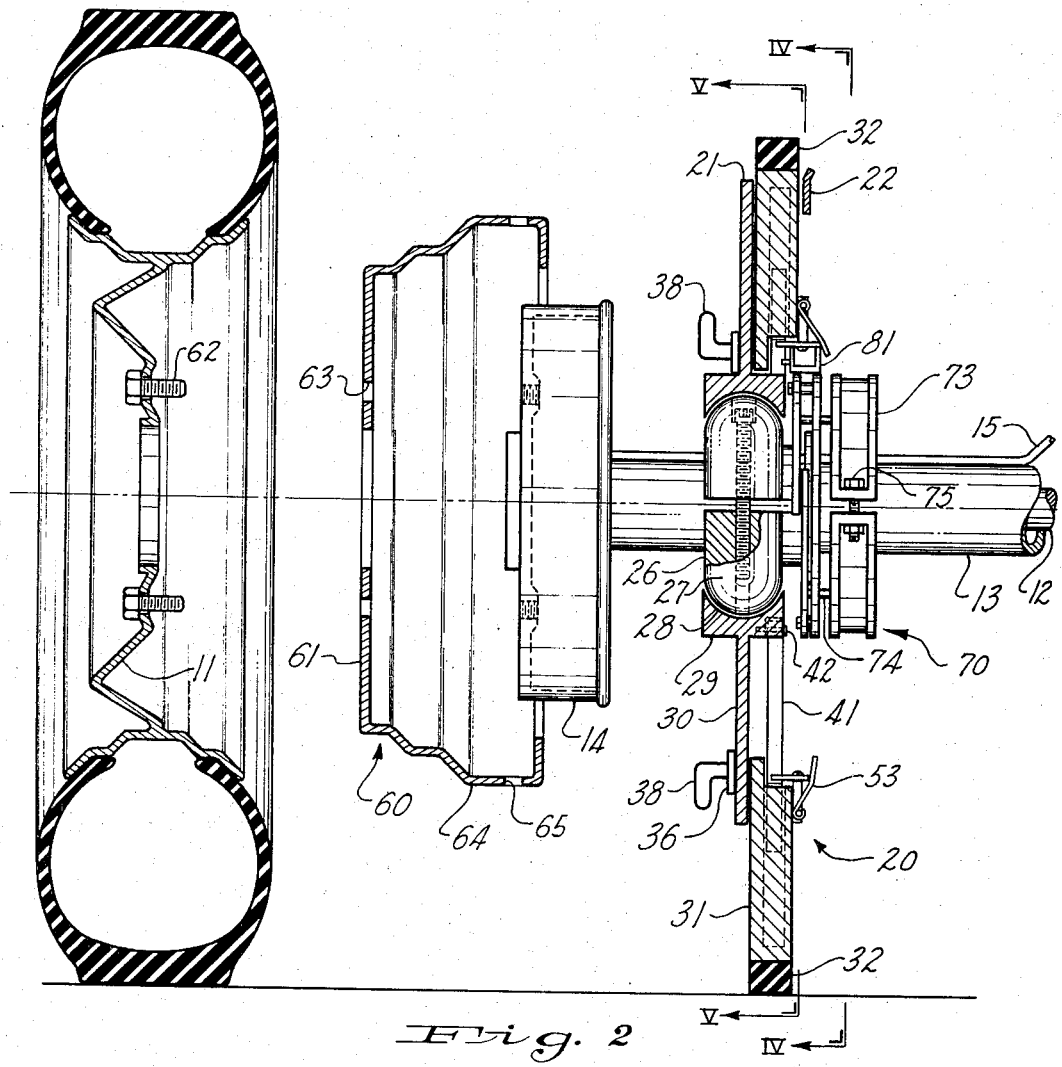
FIGURE 2 is a front exploded partial cross-sectional view of traction assistance mechanism constructed in accordance with my invention.

A preferred embodiment of my auxiliary traction mechanism 20 is shown partially exploded in FIGURE 2. The mechanism 20 comprises a driving drum, disc or wheel plate 60, an expanding shoe mechanism 30, and an operating mechanism 70, which are all assembled onto the axle housing 13 of the motor vehicle 10.

The shoe mechanism 30 is best seen in FIGURES 2 and 5. As seen particularly in FIGURES 2 and 5, the shoe mechanism 30 includes a radially-outwardly-extending frame or disc-shaped support body 21 that is preferably formed of two halves to permit easy assembly onto the axle housing 13. The halves of the support body 21 are joined by bolts 21a or other suitable fasteners as shown in FIGURES 5 and 5A. The support body portion 21 includes a circumferentially extending mounting ring 22, see FIGURES 3 and 4, that supports a mudguard shield 23 that protects the mechanism from mud and other road hazards. The support body 21 is machined or built-up to provide radially extending guide ledges or tracks 24 and is cut away to provide additional slot-like track portions 25 (see FIGURE 5). A plurality of traction shoes or driving plates 31 are mounted on the support body 21 for radial movement with respect thereto between an inwardly dormant position adjacent the axle 12 wherein the traction shoes 31 lay entirely within the outer periphery of the driven wheel 11 in horizontal projection and a radially outward operative position wherein the traction shoes 31 extend outwardly beyond the periphery of the driven wheel 11. The traction shoes preferably traverse a relatively long stroke between their inward and outward positions to prevent inadvertent engagement with the road surface while in their inward dormant position as might be caused by hitting a hole or bump in the road.

Each of the traction shoes 31 has an outwardly positioned, circumferentially extending, road surface engaging foot portion 32 that provides a suitable high traction tread. The circumferential fore and aft ends 33 of the foot portions 32 are offset inwardly to provide a lead portion that smoothes the transition spaces between the separate traction shoes 31. The aggregate circumferential extent of the foot portions 32 is preferably equal to at least one-half the length of the periphery of the driven wheel 11 so that at least one of the traction shoes 31 is in operative engagement with the road surface at all times during operation. The traction shoes 31 each include a guiding portion or pair of side edges 34 that cooperate with the tracks 24 to guide the traction shoes and to absorb non-radial forces thereon. Similarly, a pair of slot follower portions 35 (see FIGURES 5 and 6) connected by a tying part 36, cooperate with the track portions 25 to assist in guiding the traction shoes radially of the support body and absorb non-radial forces thereon.

The support body 21 is connected to the axle housing 13 by a bearing means 26 that is split to permit its easy installation. A suitable opening is provided for a brake fluid conduit 15 (see FIGURE 2). The bearing means 26 can be of various conventional forms, but is shown as having a smooth outer surface 27 that receives a cooperatively complementary shaped smooth surface 28 of the support body 21 to permit relative rotation therebetween. It will be seen that the body member 21 is thus free to move about the stationary axle housing 13. The cooperative surface 28 of the support body 21 is formed on an enlarged hub portion 29 of the support body 21.

A pair of radially extending thrust arms or supporting spokes 41 are pivotally connected to the hub 29 by pins or other pivotal connections 42 such that they are free to pivot at least in a limited extent away from the radius of the support body 21. The spokes 41 each have a position control surface 43 (see FIGURE 5) that includes a radially-inwardly facing supporting ledge portion, stop or shoulder 43a, a circumferentially-outwardly facing stop 43b, and a circumferentially facing, radially extending release cam surface 44. The traction shoes 31 each have a relatively movable core 45 that is operatively connected to the remainder of the traction shoe including the foot portion 32 thereof by a pair of resilient cushion springs 46 that are mounted within a pair of retention sockets 37. The movable core 45 provides control surface means including radially-extending, circumferentially facing opposed retention surface portions which terminate at their radially inward ends in an abrupt shoulder or radially inwardly facing ledge surface portion 48 which cooperate with the radially and circumferentially facing stops 43a and 43b of the spokes 41 to form a rigid secure interconnection between the spokes 41 and the traction shoes 31 when the traction shoes are in their outer operative position. In all other positions of the traction shoes 31, the spokes 41 are retained within the core 45 so as to be radially movable with respect thereto. A compression spring or other resilient means 49 (see FIGURES 5 and 7) positioned between each pair of spokes 41 urges the spokes circumferentially outwardly against the retention surface portion 47 of the traction shoes 31. It will thus be seen that as the traction shoes 31 move radially outwardly along the path established by tracks 24 and track portions 25, that the retention surface portion 47 will pass radially outwardly beyond the stops 43a of the spokes 41, and permit the spokes to move or pivot circumferentially outwardly into a locking engagement with the ledge surface portion 48.

FIGURES 6 and 7 show the details of selectively operable release means 50 for returning the spokes 41 to their circumferentially inward position within the core 45 to permit the retraction of the traction shoes 31. The release means 50 comprises a pair of release pawls or fingers 51 that are pivotally connected to the traction shoes 31 by suitable bolts or pins 52, the pawls 51 cooperatively engage the release cam surface 44 of the spokes 41 to wedge the spokes inwardly when operated. A pawl actuating lever or trigger 53 having balls or cam surfaces 54 thereon, is pivotally mounted by a pin 55 onto each of the traction shoes 31. A resilient stop member, such as a wire spring 56 limits the laterally outward movement of the trigger 53 so that it is at all times in position for operation. It can now be seen that when the trigger 53 is forced inwardly against the pawls 51, the pawls 51 engage the release cam surfaces 44 and wedge the spokes 41 inwardly out of cooperating engagement with the ledge surface portion 48 to thus release the locking contact therewith. Resilient means, such as a pair of tension springs 57 anchored by suitable means on the hub 29, is connected to each of the traction shoes 31 to return the traction shoes radially-inwardly when freed by the release mechanism 50.

Returning now to FIGURE 2, the driving drum 60 is shown as including a wheel attachment portion 61 at its radially inward section. The wheel attachment portion 61 is shaped to cooperatively fit over the brake drum of the drive wheel 11 inside the wheel itself, and is attached to the drive wheel 11 and powered axle 12 by the bolts or lugs 62 that fit within the conventional wheel mounting bolt holes 63. The driving drum 60 also includes a radially outward portion or sleeve 64 that extends inwardly, parallel to the vehicle axle 12 to a location just adjacent the shoe mechanism 30. The sleeve 64 is provided with radially outwardly open keyholes, driving slots or latching portions 65 that are spaced annularly thereabout in some multiple of the number of traction shoes 31 employed in the shoe mechanism 30. The keyholes or latching portions 65 in the sleeve 64 are oriented so as to permit direct radial movement of cooperating parts therethrough. Referring again to the traction shoes 31, it will be seen that the tying part 36 thereof carries a radially-outwardly extending cleat or hook portion 38 that moves radially of the support body 21 along with the traction shoes 31. The cleat 38 is sized and shaped to cooperatively interfit and latch-engage within the keyholes 65 of the driving drum 60 to provide a driving connection between when, and only when at least one traction shoe 31 is in its radially outward position. It will thus be understood that the support body 21 and the traction shoes 31 carried thereby are rotated only when at least one of the traction shoes 31 has been actuated to its radially outer position.

Selectively operable actuating means for moving the traction shoes 31 to their outer positions is shown in FIGURES 2 and 4. This means is part of the operating mechanism 70 and includes an expanding cam or guide member or member means 71 that is made up of a plurality of shutter-like members, leaves, or peripheral tracks 71a, 71b, 71c which are shaped to cooperatively selectively form a circulate cam or guide path coaxial with the axle 12 for normal dormant operation, and to form an approximately eliptical or other smooth, non-concentric cam configuration or path that has a major axis of non-concentricity that is oriented at some angle other than substantially the vertical. As shown in the drawings, FIGURE 4, the major axis of non-concentricity is horizontal so as to provide the maximum lift or distance from the axle 12 at a point directly to the rear of the axle 12. It is often preferable to reverse the orientation of the expanding cam 71 so that the traction shoes 31 are actuated to their radially outward operative position when the vehicle is in forward motion just prior to their engagement with the pavement to overcome any failure of the release mechanism described below. The central or prime shutter 71b is connected to the side or secondary shutters 71a and 71c through similar pin and slot connections 72. The side shutters 71a and 71c are pivoted to a split flange mounting bracket 73 by pins 74. The mounting bracket 73 is securely mounted upon the axle housing 13 and held in place by a pair of clamping bolts 75. The pin and slot connections 72 cause the side shutters 71a and 71c to move outwardly as the central shutter 71b moves along the axis of non-concentricity thereby providing a relatively smooth transition cam surface from the radially innermost portion to the radially outermost portion.

A pair of hydraulic motors 76 or other actuating mechanism is mounted on the split flange 73 and is aligned in the direction of the axis of non-concentricity. The motors 76 have piston rods 77 also extending in the direction of the axis of asymmetry, which are attached to the central or prime shutter 71b for moving the expanding cam 71 to its various positions. Hydraulic lines 78 supply motive fluid to the motors 76.

Each of the traction shoes 31 is provided with a cam or guide follower 81 that has a radially-inwardly facing, concave outwardly shaped cam receiving surface 82 and support arm portions 83 that are pivotally connected to the traction shoes 31 by a pin 84 that lies on the radial axis thereof. A stabilizing vane or guide finger portion 85 is securely connected and extends laterally from the inner support arm 83 and rides between the pair of spokes 41 to maintain the cam surface 82 in cooperative facing alignment with the expanding cam 71 at all times when the spokes 41 are in their circumferentially outward released position. When the spokes 41 are in their locking position, such that the traction shoes 31 are held in their radially-outward operative position, the cam follower 81 is free to pivot about its axis pin 84 (see FIGURE 4) and thereby will not receive any force that might otherwise be caused by repeated engagement with the expanding cam member 71.

The operating mechanism 70 also includes angularly stationary, selectively operable trigger actuation means 90 (see FIGURE 6) that is mounted on the mounting bracket 73 and is operable to sequentially trip the triggers 53 to release each of the traction shoes 31 from their locked outer position. The trigger actuation means 90 comprises a spring biased solenoid or other compact actuation means 91 having a rod 92 which operatively engages a movable curved trigger engaging plate 93 that is resiliently supported by return tension springs 94. The plate 93 is shaped to smoothly engage the triggers 53 of the release means 50 as they rotate in sequence past the curved plate 93. It will be seen that by locating the release mechanism rearwardly of the vehicle and the cam actuating mechanism forwardly with respect thereto as mentioned above, failure of the release mechanism causing undesired release of the traction shoes 31 can be overcome by energization of the expanding cam 71 to repeatedly move the traction shoes 31 to their outer locked position with every revolution of the wheel 11 so long as the vehicle is driven forward.

FIGURE 8 shows a preferred control system for my auxiliary traction mechanism in somewhat schematic form. In FIGURE 8 the solenoid 91 and hydraulic motors 76 are shown separate from their associated mechanism illustrated in the other views. The hydraulic motors 76 are connected to a control source of hydraulic pressure schematically indicated at 100 through the hydraulic lines 78. The pressure source 100 includes a solenoid motor 101 that drives a piston pump 102 when energized, to send pressure fluid through a discharge conduit 103 to a selector or distributor valve 104. The selector valve 104 is normally in the position shown wherein it directs the pressure fluid to the motors 76. The hydraulic system, of course, includes a suitable reservoir 105, drain or return line 106 and check valves 107 and 108. A valve control solenoid 111 is operable, when energized, to move the selector valve 104 to an upper position wherein the motors 76 are connected to the drain line 106. The motor 101 and valve control solenoid 111 are operated from the vehicle electrical system which is schematically indicated as a battery 112. Current is supplied to the motor 101 either through manual switch 113 or manually operated, automatic control switch 114. The manual switch 113 supplies current directly to the motor 101 upon closure. The automatic control switch 114 is connected to taillight switch 17. Accordingly, when the automatic control switch 114 is closed and the vehicle brakes are applied thus closing the switch 17, the motor 101 is operated to force pressure fluid into the hydraulic motors 76 and expand the cam 71. A pressure responsive feed back switch 115 is placed in the current supply line to the motor 101 to terminate the current flow in response to a predetermined pressure in the hydraulic line 103 which indicates that the hydraulic motor 76 have reached the end of their travel. The feed back switch 115 prevents the motor 101 from imposing too great a load on the electrical system 112 and from burning itself out. A deactivating switch 116 controls the operation of the solenoid 91 and the valve control solenoid 111 to return the traction shoes 31 to their inner, dormant position when closed.

The operation of the mechanism thus described is as follows: Let it be assumed that there has been a snowfall—driveways are blocked with deep snow, suburban streets are covered with packed snow that is turning to ice at intersections and the main highways are wet but clear—which situation is not an uncommon occurrence. The owner of an automobile equipped with the traction assistance mechanism of this invention does not have to shovel snow, salt his driveway, install chains or call a cab. He simply operates the switch 113 to energize motor 101, expand hydraulic motors 76, and cam 71. One or more of the traction shoes 31 will be moved directly to its outer position wherein its cleat 38 engages a keyhole 65. As the car is moved out of the garage or as the wheels spin due to snow or ice, the traction shoes 31 are sequentially brought past the expanding cam 71 and moved to and locked in their outer operative position. After one revolution of the vehicle wheel 11, the auxiliary drive mechanism 20 will be in full effect and the concentrated tread on the foot portions 32 will dig into the snow or ice and provide safe adequate gripping traction. The driver can thus safely and without delay negotiate his own driveway, the icy suburban road and any other road traction hazards he may meet on the way to the superhighway. When the superhighway is reached the driver simply opens the switch 113 and closes the switch 116 to energize the solenoids 91 and 111. The solenoid 91 moves the trigger engaging plate 93 to its operative position where it sequentially tips the triggers 53 of each traction shoe 31 as it rotates past the plate 93. Operation of each trigger 53 releases the locking engagement between the spokes 41 and the traction shoe so as to permit the springs 57 to return the traction shoe to its radially inner or dormant position. The solenoid 111 moves the selector valve 104 to its drain position wherein the hydraulic lines 78 are connected directly to the reservoir 105 and the hydraulic motors 76 are permitted to close or retract, thus collapsing the expanding cam 71. Once the auxiliary drive mechanism 20 has thus been deactivated, the switch 113 should be opened to avoid damage to the solenoid. If icy bridges exist on the highway, the automatic switch 114 is closed. Whenever the driver operates his brake, the taillight switch 17 will connect the motor 101 to the vehicle electrical source 112 and operate the expanding cam mechanism. It will thus be seen that added traction is available automatically when needed and can be released by closing switch 116 after the need is past.

For the purpose of illustration and without intended limitation thereto, I have heretofore described apparatus in accordance with my invention to demonstrate an embodiment thereof that can be utilized as an auxiliary drive mechanism on an automobile. It will be appreciated by those skilled in the art that the mechanism shown and described may also be adapted for use with other wheeled means of conveyance without departing from the spirit and disclosed concept of the invention.

More specifically, it is contemplated that my invention as shown and described may be employed on vehicles that do not utilize a live axle to supply power to a driven wheel. For example, it is contemplated that my invention may be employed as a traction assistance mechanism on the landing gear of an airplane. It is well known that the pilot of an airplane, when taking off or landing in inclement weather, experiences much the same problems of control as does the driver of an automobile traveling over slippery roads. A device such as I have presented would provide comparatively greater means of control to directionally guide an airplane moving across a runway surface and would be particularly desirable when decelerating an airplane to bring it to a safe controlled stop. For such use, it is thought that little modification of my device would be required, since the aircraft landing gear would undergo adaptive construction to be compatible for the use of my device.

Another illustrative example of the employment of my invention as a traction assistance mechanism relates to its use on a wheeled trailer that is drawn over the road behind a self-powered vehicle. Here too, my invention would serve to increase the total area of frictional contact between the vehicle and the surface over which it travels, thus, providing new and improved means of control.

It is also anticipated that my invention may be adapted for use in combination with a front or non-driven wheel of an automobile or other self-powered vehicle. Though the vehicle would require structural modification to provide a means to support the bearing means 26, no extensive change of my device would be required to permit it to function in combination with an adjacent front wheel as an emergency device to enable the driver to effectively maintain control of the vehicle.

When employed for any of the heretofore related uses, my device may be also used for the ancillary purposes of jacking or raising a vehicle to permit changing a tire, or for supporting the vehicle while it is in motion in the event of a tire blowout.

For the employment of the mechanism of my invention to jack a parked vehicle, it is necessary only to provide a thin board or block which can be, for example, two inches high by four inches wide by twelve inches long. With the mechanism activated as heretofore described such that the traction shoes 31 are in their outer operative position, the block is properly aligned so that when the vehicle is moved a short distance, an extended traction shoe will engage upon the upper surface of the block and cause the vehicle wheel adjacent the mechanism to raise out of contact with the ground surface.

My device will be found particularly useful in the event of a flat tire or blowout, especially when such an emergency is encountered while driving in traffic, in a tunnel, on a bridge, or in any other situation where immediate stopping is impossible. The cushion springs 46 provide a degree of radial displacement of the traction shoes 31 so that the vehicle simply rides up onto the traction shoes after they have been moved to their operative position. As in jacking a vehicle, here too, it is not necessary for the operating mechanism 70 to lift the vehicle upwardly. Thus, a flat tire will not disable a vehicle equipped with my invention and the necessary repair can be made at the driver's convenience.

From the foregoing description of my inventive concept and from the various illustrative examples for use of my invention, it will be appreciated that I have devised and developed a new and useful traction assistance device that is practicable from a construction, maintenance, and operational standpoint. It will also be appreciated that the traction assistance mechanism of my invention is a most appropriate and practical solution to the modern problem of localized poor traction conditions encountered by wheeled vehicles of every type. While a preferred embodiment of my invention has been shown herein for the purpose of illustration, and several contemplated uses for the invention have been related for the same purpose, it is to be understood that various changes may be made in the construction by those skilled in the art without departing from the spirit and disclosed concepts of the invention as particularly pointed out and defined in the appended claims.

What I claim is:

1. In an auxiliary traction device for use with a traction wheel that is operatively mounted on an axle of a wheeled vehicle, a support body, means independent of the wheel for rotatably mounting said support body on the axle adjacent the wheel, means for operatively connecting said support body to the wheel, a plurality of traction shoes, means mounting said traction shoes radially-movably on said support body in an annular array that is symmetrical with respect to the axle, resilient means urging said traction shoes towards radial inward positions on said support body wherein said traction shoes lay entirely within the outer periphery of the wheel in horizontal projection, selectively operable actuating means for sequentially moving each of said traction shoes radially-outwardly to operative positions wherein said shoes extend outwardly beyond the periphery of the wheel, said actuating means having expanding member means which in its first operative position defines a circular guiding path that is concentric with the axle and which in a second position defines a relatively smooth asymmetrical guiding path, asid asymmetrical path having a major axis that is oriented in a direction other than substantially downward, means for locking each of said traction shoes in its radial-outward position, and selectively operable means for releasing said locking means to permit said resilient means to retract said traction shoes to their inward positions.

2. A device as defined in claim 1 wherein said release means comprises a pair of pivotally mounted pawls for engaging each of said pairs of spokes and is circumferentially movable to move said spokes in each pair toward one another, a trigger operatively connected to each of said pair of pawls for operating said pawls, an angularly stationary, selectively operable trigger activating means, including a moveable trigger engaging plate for sequentially depressing each of said triggers when said trigger actuating means is operated, to move said spokes out of engagement with said control surface means of said traction shoes and release said locking means to permit said resilient means to retract said traction shoes to their inward positions.

3. A device as defined in claim 1 wherein each of said traction shoes has a separately movable foot portion, and resilient cushioning means are provided for urging said foot portion radially-outwardly from the remainder of said traction shoe.

4. A device as defined in claim 3 wherein the aggregate circumferential extent of all of said foot portions is equal to at least one-half the length of the periphery of the adjacent wheel.

5. A device as defined in claim 1 wherein said locking means comprises at least one radially extending supporting spoke pivotally connected to said support body adjacent each of said traction shoes, each of said spokes has radially-outwardly-facing supporting ledge portions thereon, each of said traction shoes has control surface means including a radially-extending retention surface portion and a radially-inwardly-facing ledge surface portion, said control surface means of each traction shoe operatively engages adjacent spokes and controls their pivotal position as a function of the radial location of each traction shoe on said support body, means biases each said spoke toward said control surface means, and selectively operable release means operatively engages each of said spokes to move said spokes out of engagement with said control surface means of said traction shoes and release said locking means to permit said resilient means to retract said traction shoes to their inward positions.

6. A device as defined in claim 1 wherein said support body has means for moving said operatively connecting means into secure rotative connection with the wheel when at least one of said traction shoes is moved to its radial outward operative position and for moving it out of secure rotative connection with the wheel when said traction shoes are retracted to their inward positions.

7. A device as defined in claim 1 wherein, said locking means has radially-extending supporting spoke means pivotally-connected to said support body adjacent each of said traction shoes, each said spoke means has radially-outwardly-facing supporting ledge portions thereon, each of said traction shoes has control surface means including a radially-extending retention surface portion and a radially-inwardly-facing ledge surface portion, said control surface means of each of said traction shoes operatively engages the adjacent spoke means to control the pivotal position of said spoke means as a function of the radial location of each said traction shoe, means biases each said spoke means towards said control surface means, and selectively operable release means operatively engages each of said spoke means to move each said spoke means out of engagement with said control surface means of said traction shoes to release said locking means and permit said resilient means to retract each said traction shoes to its inward position.

8. A device for use in a wheeled vehicle for increasing traction between the vehicle and the surface over which it travels, said device comprising: a support body, means for rotatably mounting said support body adjacent a wheel of the vehicle whereby an extension of the wheel's axis coincides with the axis of said mounting means, means for operatively connecting said support body to the adjacent wheel, a plurality of traction shoes, means mounting said traction shoes radially-movably upon said support body in an annular array that is symmetrical to the axis of said mounting means, resilient means urging each of said traction shoes toward radially-inward positions on said support body wherein said traction shoes lay entirely within the outer periphery of the adjacent wheel in horizontal projection, selectively operable actuating means for sequentially moving each of said traction shoes radially-outwardly to operative positions wherein said traction shoes extend outwardly beyond the periphery of the adjacent wheel, means for locking each of said traction shoes in its radially-outward position, selectively operable means for releasing said locking means to permit said resilient means to retract said traction shoes to their inward positions; said locking means comprising a plurality of pairs of radially-extending spokes each of which are pivotally connected to said support body adjacent one of said traction shoes about axes that are parallel to the axis of each of said mounting means, each of said spokes having radially-outwardly facing supporting ledge portions thereon, means resiliently urging the spokes of each pair circumferentially away from one another; each of said traction shoes having control surface means including a pair of radially-extending circumferentially facing opposed surface portions and a pair of radially-inwardly-facing ledge surface portions, said control means of each of said traction shoes operatively engaging respective spokes and controlling their pivotal positions as a function of the radial location of each of said traction shoes upon said support body, and selectively operable release means for operatively engaging each of said spokes to move them out of engagement with said control surface means of said traction shoes and release said locking means to permit said resilient means to retract said traction shoes to their inward positions.

9. A device for use in a wheeled vehicle for increasing traction between the vehicle and the surface over which it travels, said device comprising: a support body, means for rotatably mounting said support body adjacent a wheel of the vehicle whereby an extension of the wheel's axis coincides with the axis of said mounting means, means for operatively connecting said support body to the adjacent wheel, a plurality of traction shoes, means mounting said traction shoes radially-movably upon said support body in an annular array that is symmetrical to the axis of said mounting means, resilient means urging each of said traction shoes toward radially-inward positions on said support body wherein said tractionshoes lay entirely within the outer periphery of the adjacent wheel in horizontal projection, selectively operable actuating means for sequentially moving each of said traction shoes radially-outwardly to operative positions wherein said traction shoes extend outwardly beyond the periphery of the adjacent wheel, means for locking each of said traction shoes in its radially-outward position, selectively operable means for releasing said locking means to permit said resilient means to retract said traction shoes to their inward positions; said means for operatively engaging said support body to the adjacent wheel only when at least one of said traction shoes is in its radially-outward operative position; said actuating means comprising an expanding guide member having a first operative position wherein it defines a circular guide path that is concentric with the vehicle axle and a second operative position wherein it defines a relatively smooth asymmetrical guide path; each of said traction shoes having a guide follower thereon for normally engaging said guide member, and each of said guide followers being pivotally connected to its associated traction shoes and releasably held to face radially-inwardly at all times when said associated traction shoe is in its radially-outward operative position.

10. A device as defined in claim 1 wherein, said expanding member means has cooperating cam parts, and each of said traction shoes has a guide follower engaging a forward one of said cam parts.

11. A device as defined in claim 10 wherein, said expanding member means has a pair of side-positioned cam parts, each cam part of said pair has a curved guide slot therealong, and said front cam part has pins adapted to ride along said curved guide slots.

12. A device as defined in claim 11 wherein actuating means is operatively connected to said front cam part for moving it radially-inwardly and outwardly along said pair of side-positioned cam parts.

13. In an auxiliary traction device for use with a traction wheel that is operatively mounted on an axle of a wheeled vehicle, a support body, means independent of the wheel for rotatably mounting the support body on the axle adjacent the wheel, a plurality of traction shoes, means mounting said traction shoes radially-movably on said support body in an annular array about the axle, resilient means urging each of said traction shoes towards radial-inward positions on said support body at which said traction shoes lay entirely within the outer periphery of the wheel in radial projection, a group of latching portions carried by the wheel, tying means carried by each of said traction shoes for radial movement into and out of latching engagement with a cooperating one of said latching portions, selectively operable actuating means for sequentially moving each of said traction shoes radially-outwardly to an operative position at which it extends beyond the outer periphery of the wheel and at which its said tying means is in latching engagement with a cooperating one of said latching portions, means for locking each of said traction shoes in its radial-outward position, each of said tying means and a cooperating one of said latching portions when in their latching relation with each other connecting said support body to the wheel for rotation therewith, and selectively operable means for releasing said locking means to permit said resilient means to retract each of said traction shoes to its inward position and move its said tying means out of latching engagement with the cooperating one of said latching portions, whereby the wheel will be free to rotate independently of said support body.

References Cited

UNITED STATES PATENTS

| 1,849,678 | 3/1932 | Martin | 301—48 |
| 2,924,486 | 2/1960 | Blaschike | 301—48 |
| 3,016,270 | 1/1962 | Tucker | 301—48 |
| 3,112,784 | 12/1963 | Montenare | 301—38 X |
| 3,239,277 | 3/1966 | Beck | 301—38 X |

FOREIGN PATENTS

| 1,612 | 1913 | Great Britain. |

BENJAMIN HERSH, *Primary Examiner.*

C. C. PARSONS, *Assistant Examiner.*